US011636587B2

(12) United States Patent
Koronel et al.

(10) Patent No.: US 11,636,587 B2
(45) Date of Patent: Apr. 25, 2023

(54) INSPECTION OF A SEMICONDUCTOR SPECIMEN (71) Applicant: Applied Materials Israel Ltd., Rehovot (IL)

(72) Inventors: Dan Koronel, Tel Aviv (IL); Liat Shalom Mermelstein, Nes-Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 56 days.

(21) Appl. No.: 17/138,798

(22) Filed: Dec. 30, 2020

(65) Prior Publication Data
US 2022/0207682 A1 Jun. 30, 2022

(51) Int. Cl.
*G06T 7/00* (2017.01)
*G01N 21/95* (2006.01)

(52) U.S. Cl.
CPC ......... *G06T 7/001* (2013.01); *G01N 21/9501* (2013.01); *G06T 2207/30148* (2013.01)

(58) Field of Classification Search
CPC .......... G06T 7/001; G06T 2207/30148; G01N 21/9501
USPC ....................................................... 382/151
See application file for complete search history.

(56) References Cited

U.S. PATENT DOCUMENTS

| 8,498,470 | B2 * | 7/2013 | Dodzin | G06T 7/001 |
| | | | | 382/141 |
| 10,451,563 | B2 * | 10/2019 | Sousa | G01N 21/95607 |
| 2008/0187842 | A1 * | 8/2008 | Hung | G06T 7/001 |
| | | | | 430/5 |
| 2018/0238816 | A1 * | 8/2018 | Sousa | G03F 1/84 |

OTHER PUBLICATIONS

Burr, Geoffrey W., et al. "Access devices for 3D crosspoint memory." Journal of Vacuum Science & Technology B, Nanotechnology and Microelectronics: Materials, Processing, Measurement, and Phenomena 32.4 (2014): 040802, 23 pgs.

* cited by examiner

*Primary Examiner* — Roy M Punnoose
(74) *Attorney, Agent, or Firm* — Lowenstein Sandler LLP (57) ABSTRACT

There is provided a system and method of inspecting a specimen. The method includes obtaining a first image of an inspection area of a die of a semiconductor specimen and a group of reference images corresponding to a group of candidate reference units, obtaining a second image informative of one or more partitions of the inspection area respectively associated with one or more inspection algorithms, for each given pixel of the first image, determining location of one or more reference pixels thereof based on information of the second image, selecting, from the group of candidate reference units, one or more specific reference units actually required for inspecting the inspection area based on the determined location, and using one or more reference images corresponding to the selected reference units to inspect the first image, thereby providing an inspection result of the inspection area.

20 Claims, 7 Drawing Sheets

INSPECTION OF A SEMICONDUCTOR SPECIMEN

TECHNICAL FIELD

The presently disclosed subject matter relates, in general, to the field of examination of a semiconductor specimen, and more specifically, to inspection of a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

By way of non-limiting example, run-time examination can employ a two-phase procedure, e.g., inspection of a specimen followed by review of sampled locations of potential defects. Examination generally involves generating certain output (e.g., images, signals, etc.) for a specimen by directing light or electrons to the wafer and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of a defect. Most often, the goal of inspection is to provide high sensitivity to detect defects of interest, while suppressing detection of nuisance and noise on the wafer. During the second phase, at least some of the suspected locations are more thoroughly analyzed with relatively high resolution. In some cases both phases can be implemented by the same inspection tool, and, in some other cases, these two phases are implemented by different inspection tools.

Examination processes can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

Examination processes are used at various steps during semiconductor fabrication to detect and classify defects on specimens, as well as perform metrology related operations. Effectiveness of examination can be increased by automatization of process(es) as, for example, defect detection, Automatic Defect Classification (ADC), Automatic Defect Review (ADR), image segmentation, automated metrology-related operations, etc.

SUMMARY

In accordance with certain aspects of the presently disclosed subject matter, there is provided a computerized system of inspecting a semiconductor specimen, the system comprising a processing and memory circuitry (PMC) configured to: obtain a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit; obtain a second image informative of one or more partitions of the inspection area respectively associated with one or more inspection algorithms, wherein the second image is aligned with the first image, and the one or more inspection algorithms are usable to inspect pixels of the first image aligned within the one or more partitions; for each given pixel of the first image, determine location of one or more reference pixels thereof based on an inspection algorithm associated with a respective partition of the second image that the given pixel is aligned within; select, from the group of candidate reference units, one or more specific reference units actually required for inspecting the inspection area, based on the determined location of reference pixels for at least some pixels of the first image; and use one or more reference images corresponding to the selected reference units to inspect the first image, thereby providing an inspection result of the inspection area.

In addition to the above features, the system according to this aspect of the presently disclosed subject matter can comprise one or more of features (i) to (xii) listed below, in any desired combination or permutation which is technically possible:

(i). The first image is an inspection image captured by an inspection tool.

(ii). The second image is generated based on design data of the die.

(iii). The one or more regions comprises at least one non-repetitive region which does not comprise repetitive structural elements.

(iv). The one or more regions further comprise a repetitive region at least partially surrounded by the at least one non-repetitive region. The repetitive region comprises one or more arrays of repetitive structural elements.

(v). The one or more inspection algorithms are selected from a group comprising: Cell to Cell, Die to Die, Unit to Unit, and no inspection required.

(vi). For each given pixel of the first image, the location of the one or more reference pixels is within one or more of the following: one or more preceding reference units, one or more subsequent reference units, one or more reference units within the inspection area, and one or more reference dies.

(vii). The group of candidate reference units comprises one or more precedent reference units and one or more subsequent reference units. The selecting specific reference units comprises: determining the number of specific precedent reference units from the one or more precedent reference units based on reference pixel distribution of one or more pixels in a first inspection unit of the inspection area; and determining the number of specific subsequent reference units from the one or more subsequent reference units based on reference pixel distribution of one or more pixels in a last inspection unit of the inspection area. The specific precedent reference units and the specific subsequent reference units constitute the selected specific reference units.

(viii). The determining the number of specific precedent reference units comprises: if a reference pixel of at least one pixel of the first inspection unit is located in a first precedent reference unit of the one or more precedent reference units, determining the number of specific precedent reference units to be two, otherwise if a reference pixel of at least one pixel of the first inspection unit is located in a second precedent reference unit of the one or more precedent reference units, determining the number of specific precedent reference units to be one, otherwise determining the number of specific precedent reference units to be zero.

(ix). The determining the number of specific subsequent reference units comprises: if a reference pixel of at least one pixel of the last inspection unit is located in a second subsequent reference unit, determining the number of specific subsequent reference units to be two, otherwise if a reference pixel of at least one pixel of the last inspection unit is located in a first subsequent reference unit, determining the number of specific subsequent reference units to be one, otherwise determining the number of specific subsequent reference units to be zero.

(x). The using one or more reference images corresponding to the selected reference units to inspect the first image comprises pre-processing the one or more reference images together with the first image, and comparing each pixel in the first image with respective reference pixels thereof (xi). The specimen is selected from a group comprising logic device, Dynamic random-access memory (DRAM), Vertical NAND (V-NAND) Flash memory, and 3D Crosspoint memory (XPS).

(xii). The inspection result is a defect map indicative of defect distribution in the inspection area.

In accordance with other aspects of the presently disclosed subject matter, there is provided a method of inspecting a semiconductor specimen, the method performed by a processing and memory circuitry (PMC), the method comprising: obtaining a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit; obtaining a second image informative of one or more partitions of the inspection area respectively associated with one or more inspection algorithms, wherein the second image is aligned with the first image, and the one or more inspection algorithms are usable to inspect pixels of the first image aligned within the one or more partitions; for each given pixel of the first image, determining location of one or more reference pixels thereof based on an inspection algorithm associated with a respective partition of the second image that the given pixel is aligned within; selecting, from the group of candidate reference units, one or more specific reference units actually required for inspecting the inspection area, based on the determined location of reference pixels for at least some pixels of the first image; and using one or more reference images corresponding to the selected reference units to inspect the first image, thereby giving an inspection result of the inspection area.

This aspect of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of inspecting a semiconductor specimen, the method comprising: obtaining a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit; obtaining a second image informative of one or more partitions of the inspection area respectively associated with one or more inspection algorithms, wherein the second image is aligned with the first image, and the one or more inspection algorithms are usable to inspect pixels of the first image aligned within the one or more partitions; for each given pixel of the first image, determining location of one or more reference pixels thereof based on an inspection algorithm associated with a respective partition of the second image that the given pixel is aligned within; selecting, from the group of candidate reference units, one or more specific reference units actually required for inspecting the inspection area, based on the determined location of reference pixels for at least some pixels of the first image; and using one or more reference images corresponding to the selected reference units to inspect the first image, thereby giving an inspection result of the inspection area.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF THE DRAWINGS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "obtaining", "inspecting", "selecting", "using", "determining", "generating", "pre-processing", "comparing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the inspection system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to detection and/or classification of defects in a specimen, as well as metrology-related operations during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
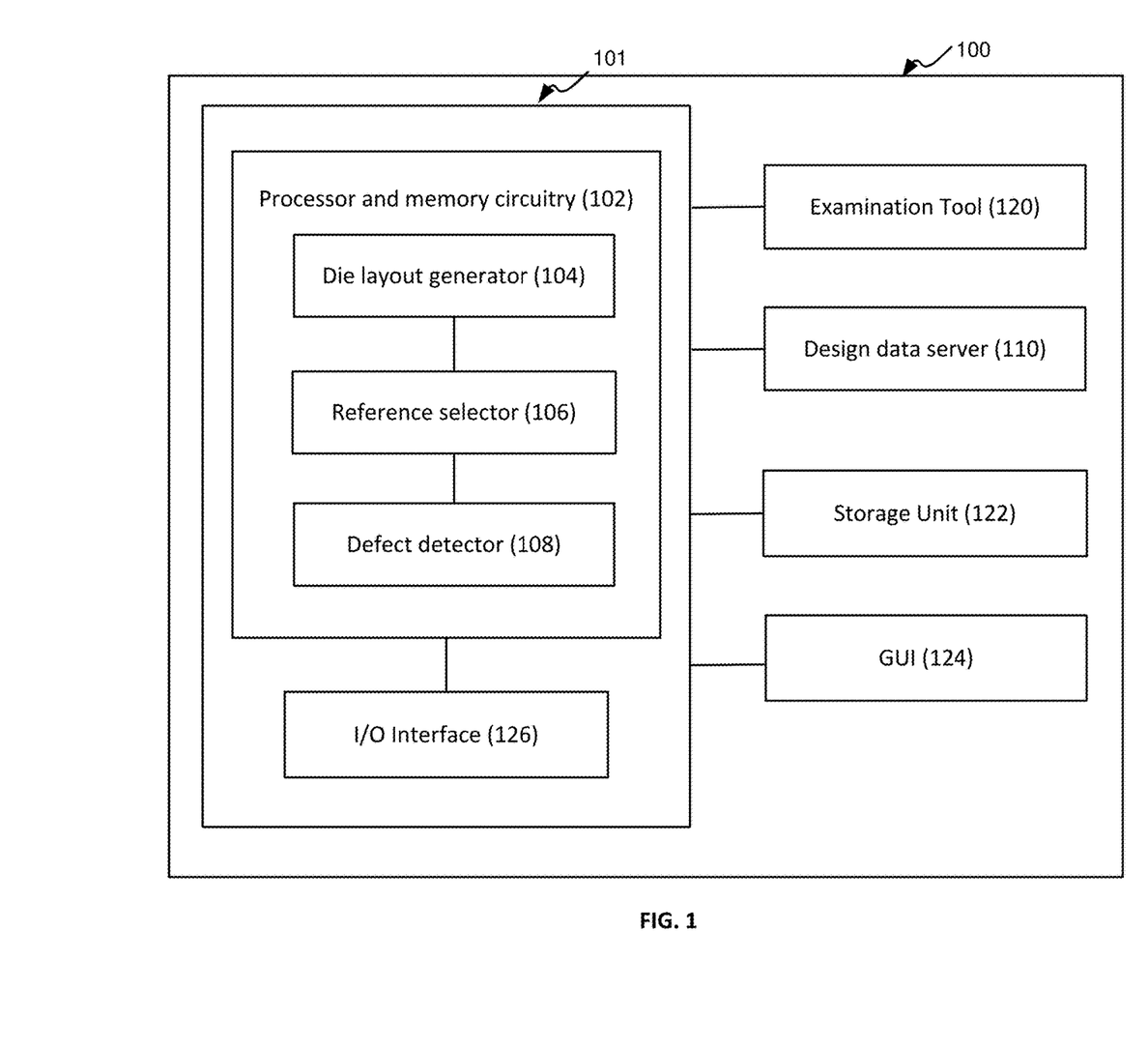
FIG. 1 illustrates a functional block diagram of an examination system for examining a semiconductor specimen in accordance with certain embodiments of the presently disclosed subject matter.

Bearing this in mind, attention is drawn to FIG. 1 illustrating a functional block diagram of an examination system for examining a semiconductor specimen in accordance with certain embodiments of the presently disclosed subject matter.

The examination system 100 illustrated in FIG. 1 can be used for examination of a semiconductor specimen (e.g., a wafer and/or parts thereof) as part of the specimen fabrication (FAB) process. According to certain embodiments of the presently disclosed subject matter, the illustrated examination system 100 comprises a computer-based system 101 capable of automatically inspecting and detecting defects using images obtained during specimen fabrication (referred to hereinafter as fabrication process (FP) images). System 101 can be operatively connected to one or more examination tools 120 which can be comprised in, or operatively connected to the examination system 100. The one or more examination tools 120 are configured to capture images and/or to inspect/review the captured image(s) and/or to enable or provide measurements related to the captured image(s).

By way of example, FP images that can be used for system 101 can be selected from a group comprising: images of a specimen (e.g., wafer, die, or parts thereof) captured during the manufacturing process, derivatives of the captured images obtained by various pre-processing stages and computer-generated design data-based images. It is to be noted that in some cases the images can include image data (e.g., captured images, processed images, etc.) and associated numeric data (e.g., metadata, hand-crafted attributes, etc.). It is further noted that image data can include data related to a layer of interest and/or to one or more other layers of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. An inspection tool is configured to scan a specimen (e.g., an entire wafer, an entire die or portions thereof) to capture inspection images (typically, at relatively high-speed and/or low-resolution) for detection of potential defects. A review tool is configured to capture review images of at least some of the defects detected by the inspection tool(s) for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operating in two different modes. In some cases, at least one examination tool can have metrology capabilities.

Without limiting the scope of the disclosure in any way, it should also be noted that the examination tools (e.g., the inspection tool(s) and/or the review tool(s)) can be implemented as examination machines of various types, such as optical imaging machines, electron beam machines and so on. In some cases, the same examination tool can provide low-resolution image data and high-resolution image data.

According to certain embodiments of the present disclosure, at least one of the examination tools 120 can be an inspection tool configured to capture one or more inspection images of one or more dies (or part thereof, such as an inspection area) of the specimen (the FP images in this case include inspection images). System 101 can be configured to analyze the inspection images and provide an inspection result. By way of example, system 101 can be configured to generate a defect map indicative of defect candidate distribution (i.e., suspected locations on the specimen having high probability of being a defect of interest (DOI)) on an inspection image using one or more reference images. As aforementioned, the inspection image can result from different examination modality(s), and the present disclosure is not limited by the inspection and metrology technology used for generating the image.

The term "defect of interest (DOI)" used herein refers to any real defects that are of the user's interest to be detected. For instance, any "killer" defects that may cause yield loss can be indicated as DOI, in comparison to the nuisance type of defects which are also real defects, but do not impact yield, and therefore should be ignored.

System 101 includes a processor and memory circuitry (PMC) 102 (also referred to as processing unit) operatively connected to a hardware-based I/O interface 126. PMC 102 is configured to provide necessary processing for operating the system 101 as further detailed with reference to FIGS. 2 and 3 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

According to certain embodiments, functional modules comprised in the PMC 102 can include a reference selector 106 and a defect detector 108. In some embodiments, optionally, the PMC 102 can further comprise a die layout generator 104. The PMC 102 can be configured to receive, e.g., from the examination tool 120, via the I/O interface 126, a first image (e.g., an inspection image) of an inspection area of a die of the semiconductor specimen.

The PMC 102 can be configured to further receive, e.g., from the examination tool 120, or from a storage unit 122 comprised in system 100, a group of reference images corresponding to a group of candidate reference units proximate to the inspection area. The group of reference images are selectable to be used for inspecting the inspection area. The inspection area comprises at least one inspection unit, or, in some cases, at least part of an inspection unit. Each inspection unit comprises one or more regions repetitive with respect to corresponding regions of one or more reference units proximate to the inspection unit. The one or more reference units have the same size and design pattern as of the inspection unit and are usable for inspection of the inspection unit, as will be described in further detail with reference to FIG. 2 and FIG. 4.

In some embodiments, the PMC 102 can be configured to obtain a second image informative of one or more partitions of the inspection area that are respectively associated with one or more inspection algorithms. The second image is aligned with the first image, and the one or more inspection algorithms are usable to inspect pixels of the first image aligned within the one or more partitions. In some cases, the second image can be pre-generated, e.g., based on design data of the specimen, and stored in a design data server 110 or the storage unit 122 as comprised in the examination system 100. In some other cases, the die layout generator 104 as optionally comprised in the PMC can be configured to generate the second image based on the design data received from the design data server 110.

The reference selector 106 can be configured to determine the references actually needed for inspecting the inspection area. Specifically, the reference selector 106 can be configured to, for each given pixel of the first image, determine location of one or more reference pixels thereof based on an inspection algorithm associated with a respective partition of the second image that the given pixel is aligned within, and select, from the group of candidate reference units, one or more specific reference units actually required for inspecting the inspection area, based on the determined location of reference pixels for at least some pixels of the first image.

The defect detector 108 can be configured to use one or more reference images corresponding to the selected reference units to inspect the first image, thereby providing an inspection result of the inspection area.

It is to be noted that the term "first" as used throughout the specification, figures and claims, does not mean the very first instance/entity, etc. Rather, it is used to be distinguishable from a "second" instance/entity, etc.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store the first images and/or derivatives thereof produced by the examination tools, as well as the second images and/or the corresponding design data. Accordingly, the stored data can be retrieved from the storage unit 122 and provided to the PMC 102 for further processing. In some embodiments, system 100 can comprise a design data server 110 configured to store design data of the specimen and/or derivatives thereof (e.g., the second images).

In some embodiments, system 101 can optionally comprise a computer-based graphical user interface (GUI) 124 which is configured to enable user-specified inputs and/or render processing outputs related to system 101. For instance, the user can be presented with a visual representation of the specimen or part thereof (e.g., by a display forming part of GUI 124), including image data of the specimen (e.g., the first images and/or the second images). Optionally, the user may be provided, through the GUI, with options of defining certain operation parameters. The user may also view certain operation results, such as, e.g., the inspection result, e.g., a defect map, or a list of defect candidates, etc., on the GUI. In some cases, system 101 can be further configured to send the inspection result to an inspection tool, and/or a review tool, and/or the storage unit 122, and/or external systems (e.g. Yield Management System (YMS) of a FAB). According to certain embodiments, the examination system 100 can further comprise one or more additional post-processing modules such as classifiers, filters, etc., and the inspection result can be sent to such modules for further processing.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that in some cases the storage unit 122 and/or GUI 124 can be external to the system 101 and operate in data communication with system 101 via I/O interface 126, while in some other cases, at least some of such units can form an internal part of system 101.

In some embodiments, system 101 can be implemented as stand-alone computer(s) to be used in conjunction with the examination tools. Alternatively, in some cases, the respective functions of the system 101 can, at least partly, be integrated with one or more examination tools, thereby facilitating and enhancing the functionalities of the examination tools in examination related processes. In such cases, components of the system 101, or at least some thereof, may form part of the examination tool 120.

For purpose of illustration only, certain embodiments of the following description are provided with respect to die(s) and wafer(s). Embodiments are, likewise, applicable to other types, sizes and representations of specimens.

Figure 2:
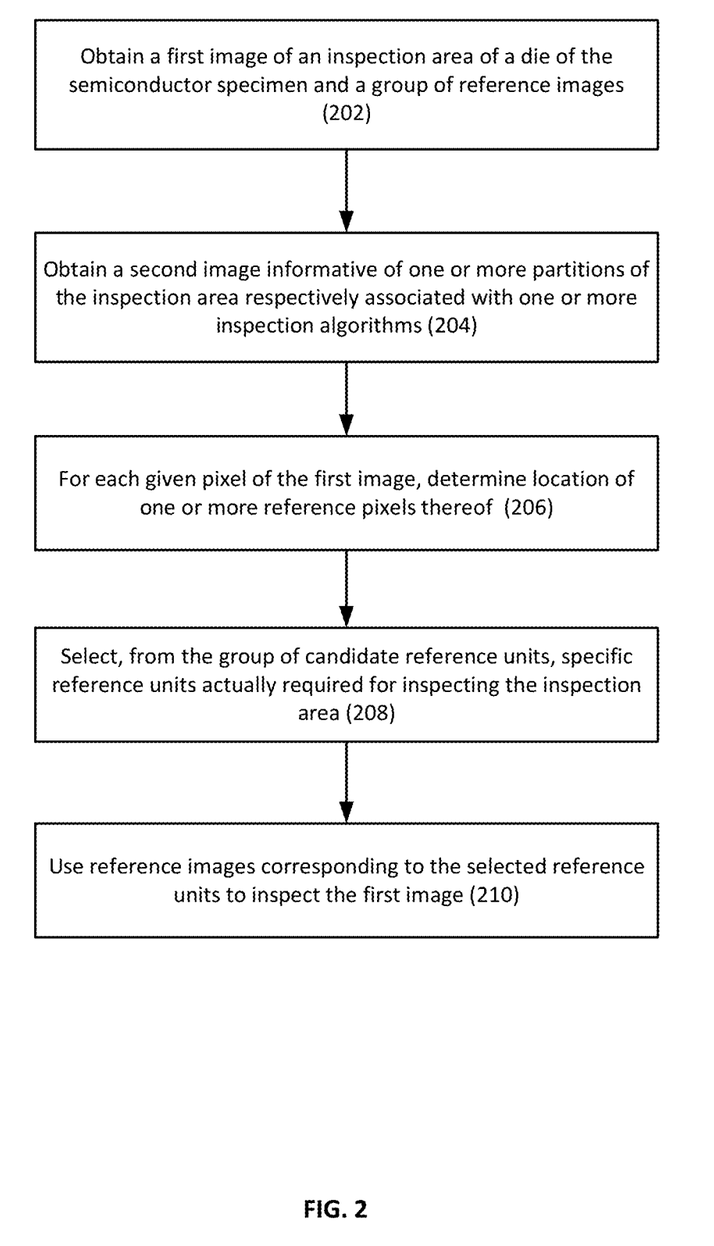
FIG. 2 illustrates a generalized flowchart of inspecting a semiconductor specimen in accordance with certain embodiments of the presently disclosed subject matter.

Referring to FIG. 2, there is illustrated a generalized flowchart of inspecting a semiconductor specimen in accordance with certain embodiments of the presently disclosed subject matter.

Before describing details of the proposed inspection process of a semiconductor specimen with reference to FIG. 2, there is first provided a description of a general inspection process as referenced herein.

Generally, for inspecting a semiconductor specimen such as a wafer, one or more inspection images can be obtained, and one or more reference images can be used to process each inspection image for detecting defects. Typically, the reference images can be obtained in various ways.

A semiconductor specimen can comprise one or more repetitive regions that include multiple repetitive structural elements such as memory cells (e.g., as those included in the memory arrays in Static random-access memory (SRAM), Dynamic random-access memory (DRAM), Ferroelectric random-access memory (FRAM), Flash memory, etc.). Repetitive regions can also include repetitive structural elements which are programmable logic cells such as those included in PLAs, PLDs. For simplicity, the repetitive structural elements that are substantially identical are sometimes referred to herein as cells.

Typically, the repetitive structural elements that are included within the same repetitive region are compared to each other or to a so-called "golden cell". Both types of comparison are known as Cell-to-Cell (C2C) comparison or C2C inspection.

Memory arrays are often surrounded by one or more non-repetitive regions (i.e., a region that does not comprise repetitive structures which are repetitive within the region). Such regions are only repetitive between the regions (e.g., one non-repetitive region with respect to another), or at the die level, thus are commonly compared to each other using a so-called Die-to-Die (D2D) comparison or D2D inspection. Therefore, a specimen that comprises both repetitive regions and non-repetitive regions are typically inspected using a hybrid comparison scheme, where, for the repetitive regions C2C is used, and for the non-repetitive regions, D2D is used.

D2D comparison involves comparing image information of one die to image information of another die. D2D comparison is less sensitive to defects in relation to C2C comparison. This is because C2C is less sensitive to process variations, color variations, and changes in the optical image acquisition (and/or illumination) process. These changes can include radiation intensity fluctuations, optic aberrations, focus related inaccuracies, sensor saturation, sensor array un-uniformity, misalignment, and the like.

Although C2C comparison has a relatively higher sensitivity as compared to D2D, it is responsive to differences between the acquisition of image information of cells that are close to the edges of the repetitive regions and the acquisition of image information of cells that are spaced apart from the edges of the repetitive regions. It is noted that image information of a certain structural element can be affected by the surrounding of that certain structural element due to relatively wide energy distribution of radiation that is used to illuminate the area, and as a result of pattern information that passes through spatial filters when illuminating structural elements that are near the edge of the array. Typically, such spatial filters are adapted to block interference lobes of an array of repetitive structural elements. Non-repetitive regions can alter the location of the interference lobes, thus pattern information can pass through these spatial filters.

Thus, C2C comparison, in some cases, suffers from such issues as aforementioned. The hybrid comparison process as described above thus suffers from both the drawbacks of D2D comparison and from the drawbacks of C2C comparison.

Therefore, in some cases, in order to improve the inspection sensitivity collectively, an inspection unit which comprises one or more non-repetitive regions (that are repetitive between the regions), and/or one or more repetitive regions, can be used as a basic unit to be inspected during the inspection. Such an inspection unit can be compared with one or more reference inspection units. Since the dimension of the inspection unit is typically larger than a cell, the inspection unit is sometimes referred to as a "big cell", and the inspection method based on the inspection unit defined as such is referred to herein as inspection unit comparison, or unit-to-unit (U2U), or big-cell-to-big-cell (BC2BC).

Figure 4:
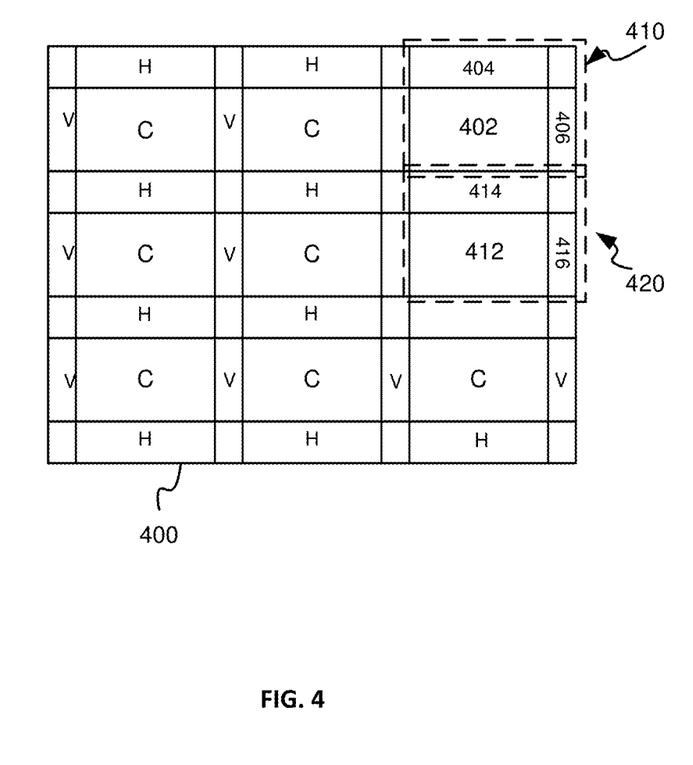
FIG. 4 illustrates an example of inspection units on a specimen in accordance with certain embodiments of the presently disclosed subject matter.

Referring now to FIG. 4, there is illustrated an example of inspection units on a specimen in accordance with certain embodiments of the presently disclosed subject matter.

As shown, the specimen 400 comprises multiple memory cell arrays (denoted as C in the figure) which are surrounded by vertical areas (denoted as V) and horizontal areas (denoted as H). The memory cell arrays are repetitive regions which comprise repetitive memory cells. The vertical and horizontal areas are non-repetitive regions which comprise logical structures that are not repetitive within each region. However, the vertical and horizontal areas are repetitive at a region level, i.e., each vertical area is repetitive with respect to the other vertical areas, and each horizontal area is repetitive with respect to the other horizontal areas.

Using the commonly implemented hybrid comparison process as described above, image information of repetitive structural elements within each memory array C is compared to image information of repetitive structural elements within the same array C, while image information of a vertical area V is compared to image information of vertical areas V of another die. This hybrid comparison process, as described above, suffers from the drawbacks of both D2D and C2C comparisons.

Alternatively, inspection units (i.e., big cells) that are repetitive with respect to each other, can be defined and used for inspection. By way of example, the inspection units can comprise both the cell arrays and the non-cell areas, such as, e.g., the inspection unit 410 that comprises the cell array 402, the horizontal area 404 and the vertical area 406, and the neighboring inspection unit 420 that comprises the cell array 412, the horizontal area 414 and the vertical area 416. Using the inspection unit comparison (U2U) as described above, the image information of inspection unit 410 can be compared with the image information of the neighboring inspection unit 420 (and possibly additional neighboring inspection units), thereby giving rise to an inspection result.

By way of another example, the inspection units can be defined to comprise only the non-cell areas (e.g., the horizontal areas and/or the vertical areas) which are not repetitive within themselves, but are repetitive with respect to each other. For instance, the inspection unit 410 can be alternatively defined as comprising the horizontal area 404 and/or the vertical area 406 (excluding the cell array 402). The present disclosure is not limited by the specific way of defining the inspection units, as long as they maintain the repeatability/periodicity at the region level.

Typically, for inspecting an inspection unit, one or more reference units are used. In some embodiments, at least two reference units are needed in order to obtain an inspection result with higher accuracy. By way of example, two reference units that are proximate to the inspection unit (e.g., two neighboring inspection units) can be used. In some cases, the two reference units can be the precedent inspection unit and the subsequent inspection unit that are adjacent to the inspection unit to be inspected (precedent and subsequent in terms of the scanning order). In some other cases, the two reference units can be the two precedent units or the two subsequent units. For instance, in case of a vertical scanning of the wafer from top to bottom, the precedent inspection unit refers to the top/upper inspection unit, and the subsequent inspection unit refers to the bottom/lower inspection unit with respect to the inspection unit to be inspected.

According to certain embodiments of the presently disclosed subject matter, an inspection area on a die of a specimen is to be inspected. The inspection area used herein refers to an area of interest that is to be inspected on the die. The inspection area can be taken from any part of the die with any appropriate dimensions. By way of example, the dimension of an inspection area can be determined based on the number of processing units used to inspect the entire die and the dimensions of the die. For instance, the inspection area can be an image block of an inspection image that is assigned to be processed by the PMC 102.

The inspection area can comprise one or more inspection units or at least a part of an inspection unit. Since a specimen manufactured for a specific semiconductor product may comprise different structures in different regions, when inspecting a specific inspection area comprising specific structures, it is not always certain how many/which reference units to use for inspecting the inspection units in the inspection area, as will be illustrated in the examples of FIGS. 5 and 6 below.

Figure 5:
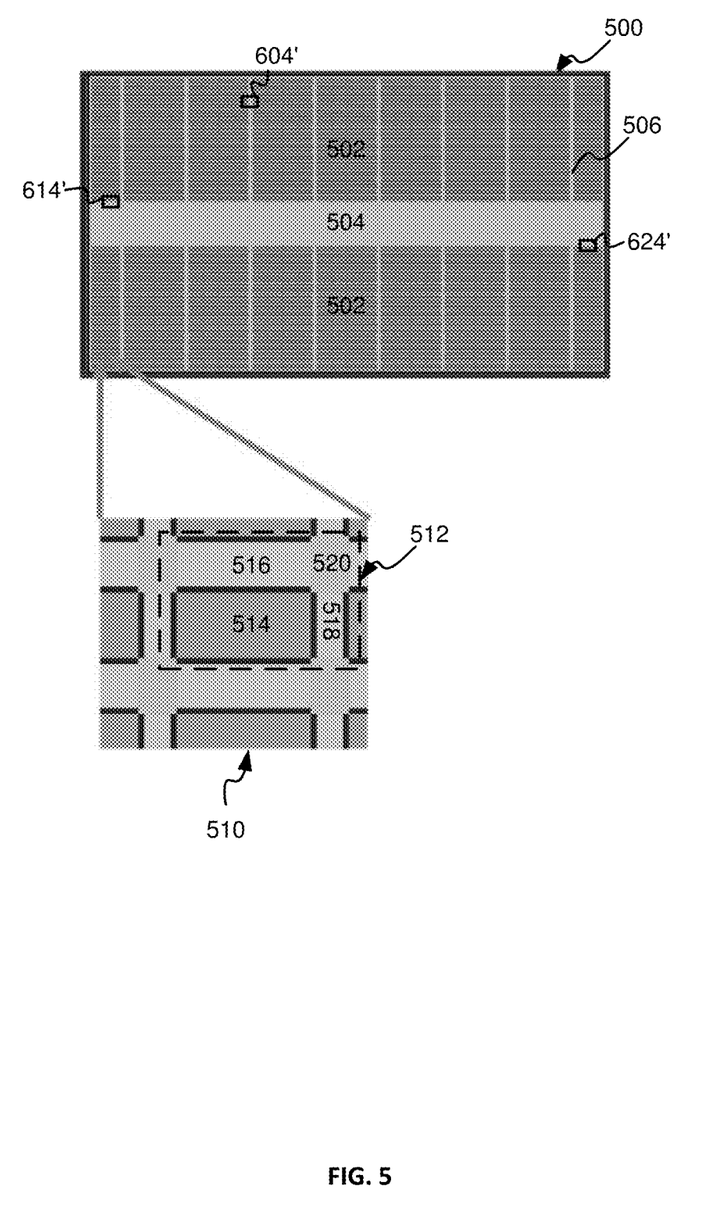
FIG. 5 illustrates an example of a die of Dynamic random-access memory (DRAM) in accordance with certain embodiments of the presently disclosed subject matter.

Referring now to FIG. 5, there is illustrated an example of a die of Dynamic random-access memory (DRAM) in accordance with certain embodiments of the presently disclosed subject matter.

DRAM is a type of random-access semiconductor memory that stores data in memory cells. 500 shows a schematic illustration of a typical die of DRAM. As illustrated, the DRAM die comprises memory regions 502 which include multiple cell arrays and non-memory regions such as, e.g., the horizontal stitch 504 (i.e., the periphery stitch) between the memory regions and the vertical stitches 506 between the cell arrays. Specifically, a magnified view 510 of a portion of the cell arrays shows a basic unit 512 (marked by dashed line) comprising a cell area 514 of memory cells, a horizontal logic area 516 (i.e., Sense Amplifier (SA)), a vertical logic area 518 (Sub Word-line Driver (SWD)), and an intersection area 520. The cell arrays comprise multiple such units 512 which are repetitive with respect to each other. Therefore, 512 can be regarded as an inspection unit (i.e., "big cell") as described above and a U2U inspection method can be used for inspecting the die 500. For instance, the inspection unit 512 can be inspected using two neighboring reference units. Note that the horizontal stitch 504 and the vertical stitches 506 are not part of the inspection units. They are inspected using either D2D, or, in some cases, are not required to be inspected.

Figure 6:
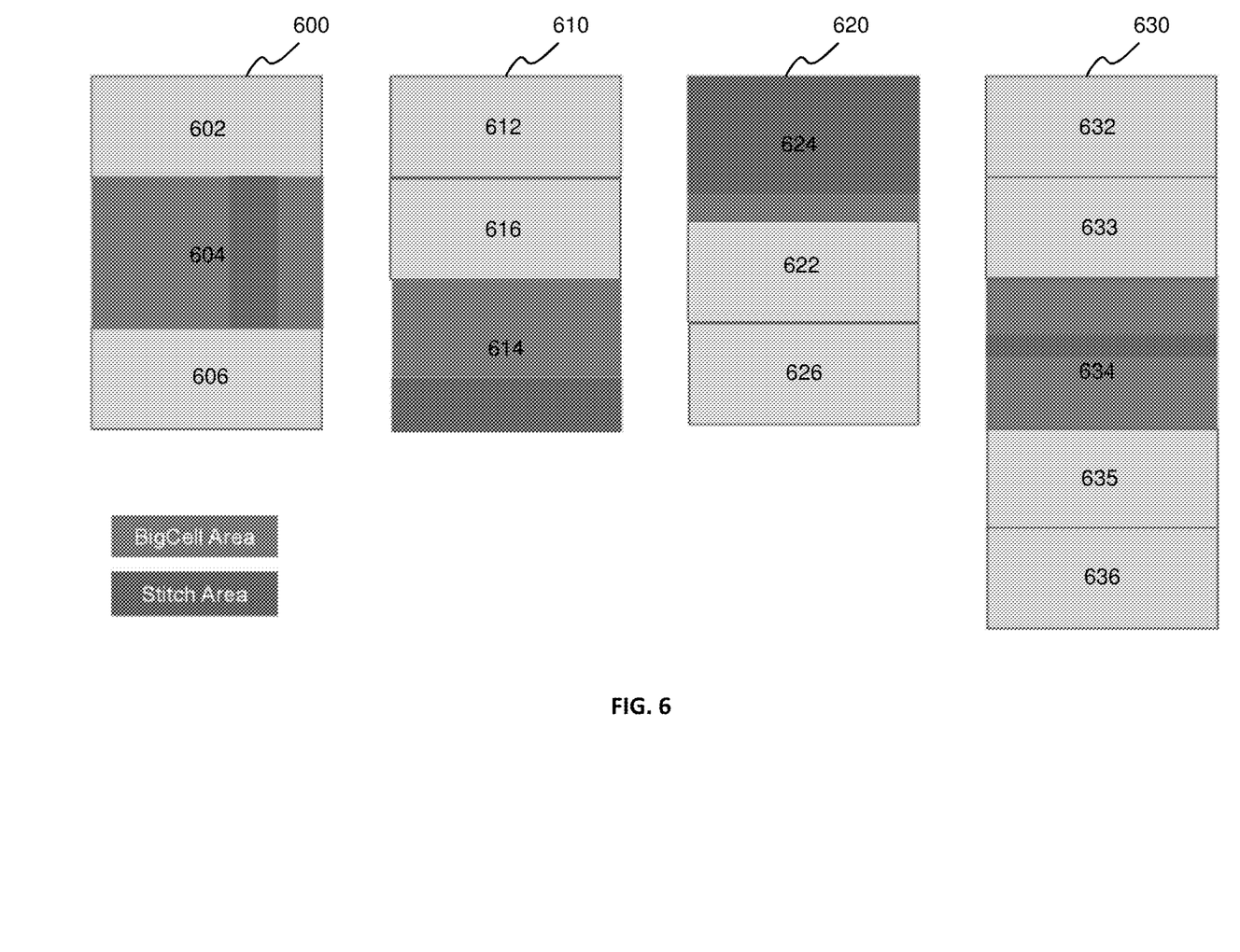
FIG. 6 illustrates examples of different inspection areas on the die and respective reference units required for inspecting the inspection areas in accordance with certain embodiments of the presently disclosed subject matter.

As can be seen from FIG. 5, the die 500 comprises different structures in different regions (e.g., the multiple cell arrays, the horizontal stitch and the vertical stitches). An inspection area to be inspected, depending on its specific location in the die, may comprise different structures thus requiring using different reference units. Turning now to FIG. 6, there are illustrated examples of different inspection areas on the die and respective reference units required for inspecting the inspection areas in accordance with certain embodiments of the presently disclosed subject matter.

Specifically, four examples 600, 610, 620 and 630 of different inspection areas at different locations of the die are illustrated. Each inspection area in the four examples comprises an inspection unit area (denoted as "BigCell area") and a non-inspection-unit area (denoted as "Stitch area"). The inspection unit area includes one or more inspection units or at least part of an inspection unit as described above. The examples are illustrated and described assuming the scanning order of the die is vertical, e.g., from top to bottom, and assuming the inspection area comprises one and a half inspection units (in terms of the vertical dimension).

As shown, the first example 600 illustrates an inspection area 604 in which the stitch area includes a vertical stitch (such as, e.g., the vertical stitch 506 as illustrated in FIG. 5). By way of example, the inspection area 604 can be located at, e.g., the area 604' of the specimen 500 as illustrated in FIG. 5. In such cases, the two reference units can be selected as the precedent inspection unit 602 (i.e., the top neighboring unit) and the subsequent inspection unit 606 (i.e., the bottom neighboring unit) of the inspection area 604.

The second example 610 illustrates an inspection area 614 where the inspection unit area comprises a bottom edge of the cell arrays, and the stitch area comprises part of a horizontal stitch (such as, e.g., the horizontal stitch 504 as illustrated in FIG. 5, the width of which is relatively larger in the vertical direction as compared to the width of the inspection area). For illustrative purposes, the inspection area 614 can be located at, e.g., the area 614' of the specimen 500 as illustrated in FIG. 5. In such cases, the stitch area serves as a pattern "breaker" of the cell arrays, and there is no subsequent inspection unit to be used as a reference unit, therefore the two reference units should be selected as the two precedent inspection units 612 and 616 (i.e., the top two neighboring units) of the inspection area 614.

Similarly, the third example 620 illustrates an inspection area 624 where the inspection unit area comprises a top edge of the cell arrays, and the stitch area comprises part of a horizontal stitch (such as, e.g., the horizontal stitch 504 as described above). For illustrative purposes, the inspection area 624 can be located at, e.g., the area 624' of the specimen 500 as illustrated in FIG. 5. In such cases the stitch area serves as a breaker of the cell arrays, and there is no precedent inspection unit to be used as a reference unit for the inspection unit area, therefore the two reference units should be selected as the two subsequent inspection units 622 and 626 (i.e., the top two neighboring units) of the inspection area 624.

The fourth example 630 illustrates a specific scenario of an inspection area 634 which comprises an entire horizontal stitch (i.e., the width of the horizontal stitch is relatively smaller as compared to the width of the inspection area in the vertical direction) and the inspection unit area is divided by the horizontal stitch into two sub-areas. In such cases, the stitch area serves as a breaker of the two sub-areas of the inspection unit area which require respective reference units. Therefore, for the upper sub-area, the two reference units thereof should be selected as the two precedent inspection units 632 and 633 (i.e., the top two neighboring units) of the inspection area 634. And for the bottom sub-area, the two reference units should be selected as the two subsequent inspection units 635 and 636 (i.e., the bottom two neighboring units) of the inspection area 634. It is to be noted that the inspection area 624 is illustrated for exemplary purposes only and the specific structure of this example does not exist in the exemplified die 500 of FIG. 5.

Therefore, in order to cover different structures of different inspection areas of the same die or different dice, conventionally during inspection, a group of four reference inspection units, comprising the two precedent and two subsequent inspection units of an inspection area, are all selected and processed for preparation of defect detection in the inspection area. However, since the size of the inspection unit is considerably large, image preparation of four reference images of the four reference inspection units together with the inspection image of the inspection area, would take a lot of computation time and resources, thus causing a significant image processing overhead which leads to a throughput (TpT) hit for the inspection process.

Figure 7:
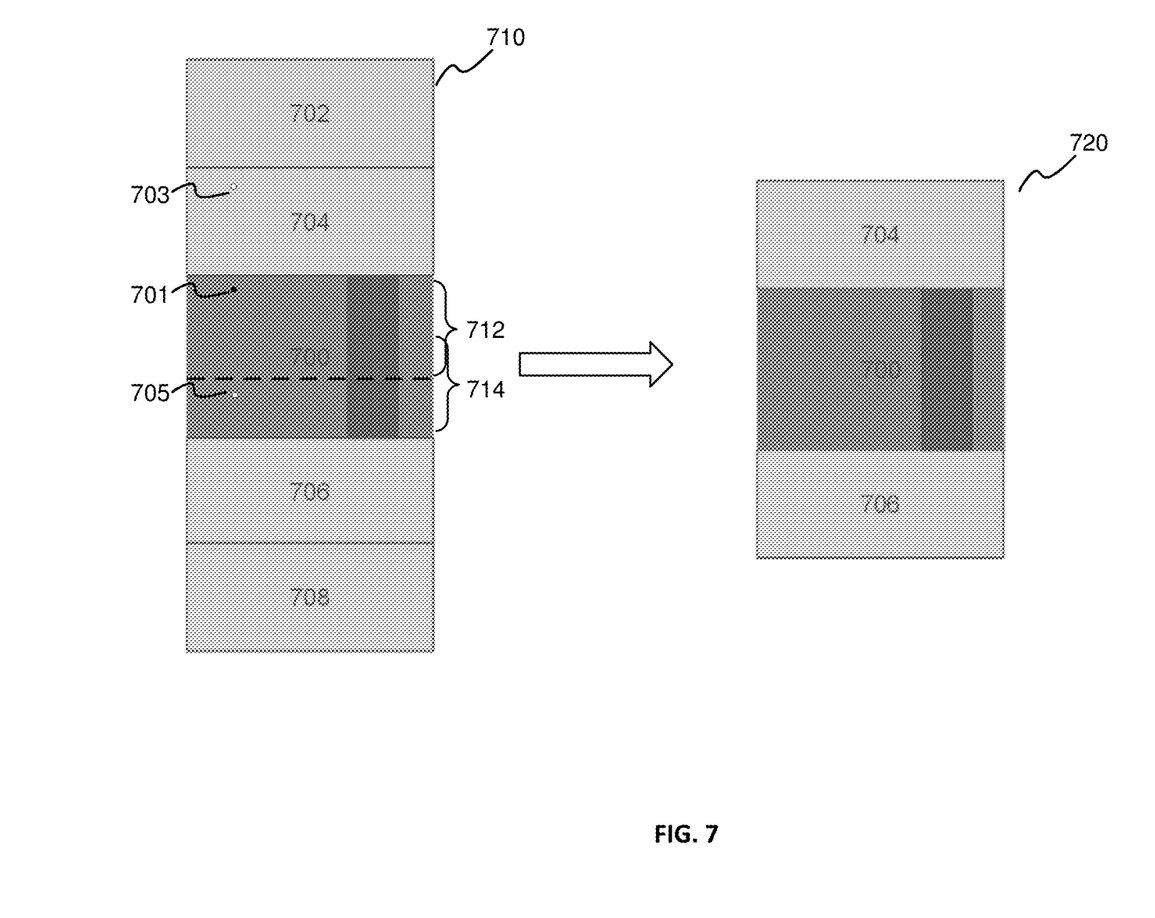
FIG. 7 illustrates an example of an inspection area and the selected reference units thereof in accordance with certain embodiments of the presently disclosed subject matter.

According to certain embodiments of the presently disclosed subject matter, there is proposed an improved inspection process to determine/select the references that are actually needed for the inspection of a specific inspection area, and use only the selected references for image processing and defect detection. As illustrated in FIG. 7, for an inspection area 700, the group of four reference units 702, 704, 706 and 708 used to be all selected, and the four corresponding reference images are processed (as shown in 710). Using the proposed improved inspection process, for the specific inspection area 700, only the references that are actually needed are selected to be used. For instance, in the present example, the reference units actually required for inspecting the area 700 are the two neighboring reference units 704 and 706. Therefore, only the reference images for these two reference units are selected and processed (as shown in 720), together with the inspection image for area 700, instead of processing the four reference images, thereby reducing the image processing overhead and improving the throughput of the inspection process. Details of the proposed inspection process are now described with reference to FIG. 2.

Referring back to FIG. 2, a first image of an inspection area of a die of the semiconductor specimen can be obtained (202) (e.g., by the PMC 102 of system 101) from the examination tool 120 via the I/O interface 126, or from the storage unit 122. The first image is an inspection image captured by an inspection tool (such as, by way of example, the Elite and the UVision systems by Applied Materials, Inc., etc.). The inspection image can result from different examination modality(s), and the present disclosure is not limited by the inspection and metrology technology used for generating the image.

For purpose of selecting the references actually needed for inspecting the image, as described above, a group of reference images corresponding to a group of candidate reference units proximate to the inspection area can be obtained (202) (e.g., by the PMC 102 in system 101). The group of reference images are selectable to be used for inspecting the inspection area. In some cases, the inspection image and the group of reference images can be obtained from the same inspection image of the die, or, alternatively, in some other cases, they can be obtained separately from different images of the same die, or different dies.

The inspection area can be taken from any part of the die with any appropriate dimensions as described above. The present disclosure is not limited with respect to the resolution or size of the inspection area. The inspection area can comprise one or more inspection units, or in some cases comprise at least part of an inspection unit. In the example of FIG. 7, the inspection area 700 comprises one and a half inspection units (in terms of the width dimensions in the vertical direction). In some other cases, it is possible that an inspection area may comprise only part of an inspection unit. The size of the inspection area relative to the inspection unit can depend on one or more different factors such as, e.g., the repetitiveness/periodicity of the patterns on the die, the ways of obtaining the inspection area from the die, etc. By way of example, as described above, the size of an inspection area can be determined based on the number of processing units used to inspect the entire die and the dimensions of the die. For instance, the inspection area can be an image block of an inspection image that is assigned to be processed by the PMC 102.

Each inspection unit can comprise one or more regions repetitive with respect to corresponding regions of one or more reference units proximate to the inspection unit. The one or more reference units have the same size and design pattern as of the inspection unit and can be used for inspection of the inspection unit. According to certain embodiments, the one or more regions can comprise at least one non-repetitive region which does not comprise repetitive structural elements. In some embodiments, the one or more regions can further comprise a repetitive region that is at least partially surrounded by the at least one non-repetitive region. The repetitive region comprises one or more arrays of repetitive structural elements.

An inspection unit can be exemplified as, e.g., the example of 512 in FIG. 5, which comprises one or more of the regions 514, 516, 518 and 520. By way of example, the inspection unit can include at least one non-repetitive region, such as, e.g., the region 516, 518 or 520, which is a logic area that comprises logical structures which are not repetitive within the region itself. Nevertheless, such regions are repetitive at a region level, i.e., they are repetitive with respect to corresponding regions in other inspection units. For instance, the region 516 is repetitive with respect to one or more corresponding regions in the precedent and subsequent inspection units of the inspection unit 512. By way of another example, the inspection unit can further comprise at least one repetitive region such as, e.g., region 514 that comprises repetitive structural elements such as memory cells. The region 514 is surrounded by the at least one non-repetitive region (e.g., the region 516, 518 or 520).

The group of candidate reference units can comprise one or more precedent reference units and one or more subsequent reference units that are proximate to the inspection area. For instance, in the example of FIG. 7, the group of candidate reference units can comprise two precedent reference units 702 and 704 and two subsequent reference units 706 and 708. The group of candidate reference units are selectable to be used for inspecting the inspection area.

In addition to the first image and the group of reference images, a second image can be obtained (204) (e.g., by the PMC 102 in system 101) from the design data server 110 via the I/O interface 126, or from the storage unit 122. The second image is informative of one or more partitions of the inspection area that are respectively associated with one or more inspection algorithms. The second image can be aligned with the first image, and the one or more inspection algorithms are usable to inspect pixels of the first image aligned within the one or more partitions. In some embodiments, the second image can be generated based on design data of the die.

As illustrated above, different regions on a die may include different patterns, such as, e.g., memory regions (including repetitive/periodical structural patterns, such as arrays of memory cells), logic regions (that usually do not include repetitive structural patterns), and background regions (that are ideally very smooth). A die layout image can be generated based on design data of a die and comprise information indicative of different partitions on a die that are characterized by different patterns. By way of example, a die layout image for the die 500 in FIG. 5 can be indicative of partitions of memory regions 502 characterized by the repetitive patterns thereof, and partitions of logic regions 504 and 506 characterized by the non-repetitive patterns thereof. While not necessarily so, the die layout image can comprise polygons, such as rectangles indicative of the partitions. In some cases, the die layout image can also include information of the repetitive patterns in the memory regions, e.g., the repetitive cell size, and the repetitive cell direction, etc.

Due to the different structures of different regions, these regions may need different types of inspection algorithms respectively. By way of example, the one or more inspection algorithms can be selected from a group comprising: C2C, D2D, U2U, and no inspection required. For instance, regions 502 that include repetitive patterns can be inspected, e.g., using U2U, or C2C and D2D inspection, while regions 504 and 506 may be suitable, e.g., for D2D inspection, or in some cases do not require to be inspected. In some embodiments, the die layout image can be further informative of the one or more inspection algorithms that are respectively associated with the different partitions.

According to certain embodiments, the second image can be a die layout clip which is part of the die layout image. By way of example, the die layout clip can be informative of one or more partitions of the inspection area that are respectively associated with one or more inspection algorithms. In some cases, the die layout clip can be generated by extracting, from a pre-generated die, a layout image in accordance with location and dimension information of the inspection area. In some other cases, the die layout clip can be derived directly from the design data characterizing the die in accordance with the location and dimension information, since a pre-generated die layout in some cases can cause extensive data storage consumption, as well as hardware expenses and maintenance costs thereof. In some embodiments, the die layout image and/or the die layout clip can be generated e.g., by the die layout generator 104 of PMC 102. In some other cases, the die layout clip can be pre-generated by a separate processing entity that is external to system 101 and stored in the design data server 110 or storage unit 122 to be used by system 101.

In the example of FIG. 7, the die layout clip corresponding to the inspection area 700 can be informative of two partitions including a first partition indicative of the inspection unit area (i.e., the big cell area) and a second partition indicative of the vertical stitch area. The first partition is associated with a U2U inspection algorithm, and the second partition is associated with a D2D inspection algorithm.

The second image can be aligned/registered with the first image, and the one or more inspection algorithms, as indicated in the second image, are usable to inspect pixels of the first image aligned within the one or more partitions. For instance, in the example of FIG. 7, the pixels of the inspection image of inspection area 700 that fall within the first partition, as indicated by the second image, can be inspected using U2U inspection that is associated with the first partition, and similarly the pixels that fall within the second partition can be inspected using D2D inspection that is associated with the second partition.

Therefore, the first image can be inspected using the corresponding information indicated by the second image. Specifically, for each given pixel of the first image, the location of one or more reference pixels thereof can be determined (206) (e.g., by the reference selector module 106 of the PMC 102) based on an inspection algorithm associated with a respective partition of the second image that the given pixel is aligned within.

According to certain embodiments, for each given pixel of the first image, the location of the one or more reference pixels can be within one or more of the following: one or more preceding reference units, one or more subsequent reference units, one or more reference units within the first area, and one or more reference dies.

For instance, an exemplary pixel 701 of a first image is illustrated in FIG. 7. The pixel 701 falls within the first partition (indicative of the inspection unit area (i.e., the big cell area)) as indicated by the second image, and is therefore inspected using U2U inspection associated with the first partition. Assume the inspection area comprises one and a half inspection units, and two reference units are needed for inspecting each inspection unit. The pixel 701 is within the first inspection unit 712 (as marked with dash lines in FIG. 7) of the inspection area. The two reference units for the first inspection unit 712 should be the precedent reference unit 704, and the inspection unit that is partially within the inspection area and partially in the reference unit 706. Therefore, the two reference pixels for pixel 701 can be found as the corresponding pixel 703 in the precedent reference unit 704, and the corresponding pixel 705 in the inspection unit that is partially within the inspection area. By way of another example, any pixel within the second partition (indicative of the vertical stitch area) should be inspected using D2D inspection, thus the reference pixels thereof are located in reference dies of the current die (not illustrated in FIG. 7).

One or more specific reference units that are actually required for inspecting the inspection area can be selected (208) (e.g., by the reference selector module 106 of the PMC 102) from the group of candidate reference units, based on the determined location of reference pixels for at least some pixels of the first image. The group of candidate reference units comprises one or more precedent reference units and one or more subsequent reference units.

Figure 3:
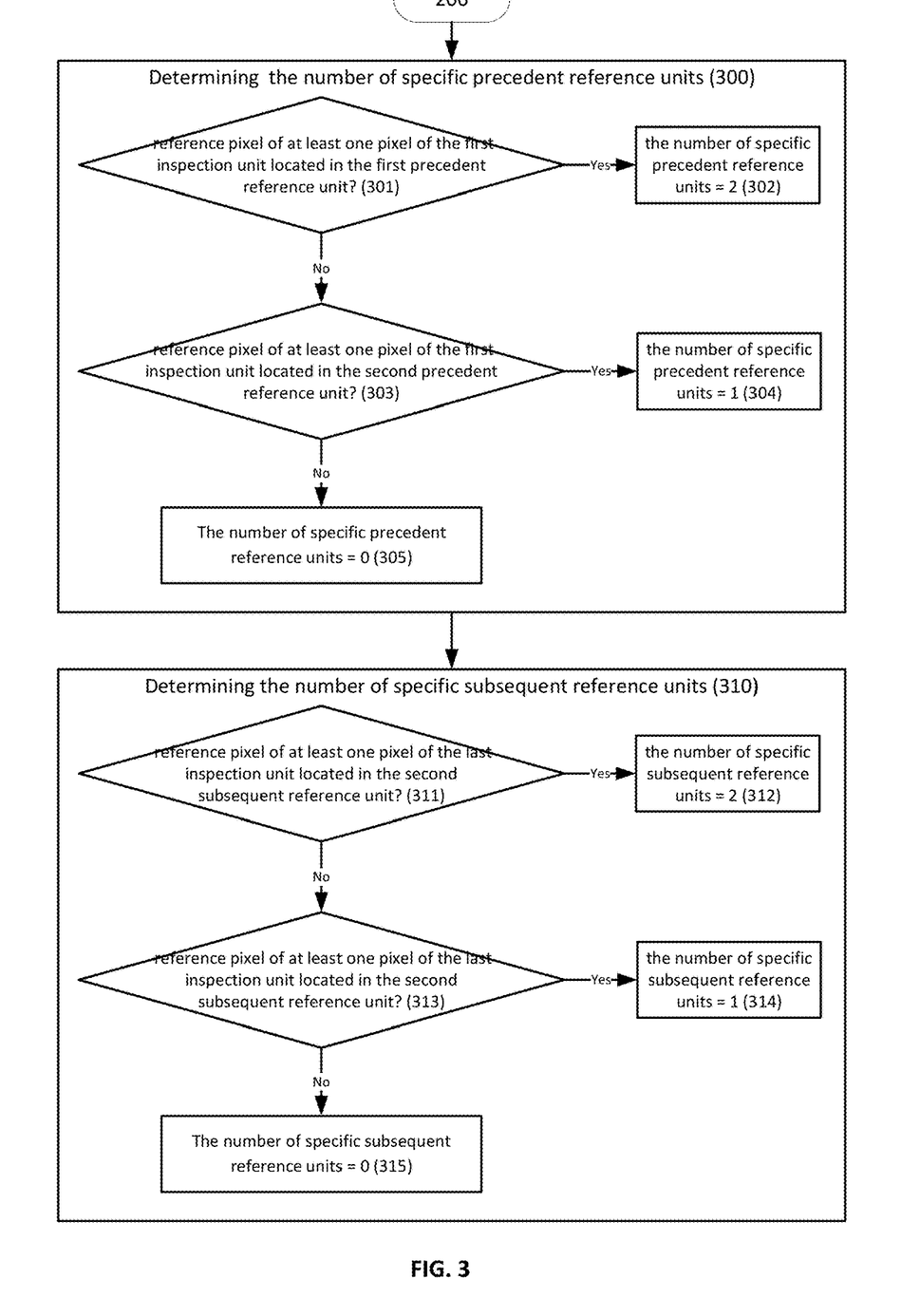
FIG. 3 illustrates a generalized flowchart of selecting the specific reference units that are actually required for inspecting the inspection area in accordance with certain embodiments of the presently disclosed subject matter.

Referring now to FIG. 3, there is illustrated a generalized flowchart of selecting the specific reference units that are actually required for inspecting the inspection area in accordance with certain embodiments of the presently disclosed subject matter.

According to certain embodiments, the specific reference units can be selected as follows: determining (300) the number of specific precedent reference units from the one or more precedent reference units based on reference pixel distribution of one or more pixels in a first inspection unit of the inspection area, and determining (310) the number of specific subsequent reference units from the one or more subsequent reference units based on reference pixel distribution of one or more pixels in a last inspection unit of the inspection area. The specific precedent reference units and the specific subsequent reference units constitute the selected specific reference units. Reference pixel distribution refers to how the location of the reference pixels of the one or more pixels is distributed.

Specifically, the number of specific precedent reference units can be determined (300) as follows: if a reference pixel of at least one pixel of the first inspection unit is located in a first precedent reference unit of the one or more precedent reference units (301), determining (302) the number of specific precedent reference units to be two; otherwise if a reference pixel of at least one pixel of the first inspection unit is located in a second precedent reference unit of the one or more precedent reference units (303), determining (304) the number of specific precedent reference units to be one; otherwise determining (305) the number of specific precedent reference units to be zero.

Similarly, the number of specific subsequent reference units can be determined (310) as follows: if a reference pixel of at least one pixel of the last inspection unit is located in a second subsequent reference unit (311), determining (312) the number of specific subsequent reference units to be two; otherwise if a reference pixel of at least one pixel of the last inspection unit is located in a first subsequent reference unit (313), determining the number of specific subsequent reference units to be one (314); otherwise determining (315) the number of specific subsequent reference units to be zero.

By way of example, as described above, the inspection area 700 as illustrated in FIG. 7 comprises one and a half inspection units. FIG. 7 shows a first inspection unit 712 (first as counting from the top of the inspection area, in accordance with scanning order) and a last inspection unit 714 (last as counting from the bottom of the inspection area) of the inspection area 700. Therefore, in the present example, the first and last inspection units overlap with each other by half of an inspection unit. The group of candidate reference units selectable for inspecting the inspection area 700 include the four reference units: two precedent reference units 702 and 704, and two subsequent reference units 706 and 708. The specific reference units that are actually required for inspecting the inspection area 700 can be selected from the group of candidate reference units based on the location of reference pixels for at least some pixels of the inspection image of the inspection area.

Specifically, for selecting the specific precedent reference units actually required, it is needed to determine if any pixel in the first inspection unit 712 has a reference pixel in reference unit 702 (i.e., the first precedent reference unit). In the present example, there is no such pixel in the first inspection unit 712. Then, it is needed to determine if any pixel in the first inspection unit 712 has a reference pixel in reference unit 704 (i.e., the second precedent reference unit). In the present example, each of the pixels in the first inspection unit 712 that fall within the first partition (i.e., the big cell area) have a reference pixel from the reference unit 704. Therefore, the number of specific precedent reference units should be one, and the specific precedent reference unit to be selected is the reference unit 704.

Similarly, for selecting the specific subsequent reference units actually required, it is needed to determine if any pixel in the last inspection unit 714 has a reference pixel in reference unit 708 (i.e., the second subsequent reference unit). In the present example, there is no such pixel in the last inspection unit 714. Then it is needed to determine if any pixel in the last inspection unit 714 has a reference pixel in reference unit 706 (i.e., the first subsequent reference unit). In the present example, each of the pixels in the last inspection unit 714 that fall within the first partition (i.e., the big cell area) have a reference pixel from the reference unit 706. Therefore, the number of specific subsequent reference units should be one, and the specific precedent reference unit to be selected is the reference unit 706. Therefore, the specific reference units that are actually required for inspecting the inspection area 700 are selected to be reference units 704 and 706.

In the example of the inspection area 614 as illustrated in FIG. 6, using the above described methodology, the specific reference units that are actually required for inspecting the inspection area 614 can be automatically determined to be the two precedent reference units 612 and 616, thus reflecting the specific structure of edge of arrays and the respectively required reference units in such cases. Similarly, in the example of the inspection area 624, the specific reference units that are actually required for inspecting the inspection area 624 can be automatically determined to be the two subsequent reference units 622 and 626. In the example of the inspection area 634, due to the specific structure of a horizontal stitch breaker, the specific reference units that are actually required for inspecting the inspection area 634 are selected to be the two precedent reference units 632 and 633 and the two subsequent reference units 635 and 636.

Referring back to FIG. 2, one or more reference images corresponding to the selected reference units can be used (210) (e.g., by defect detector 108 of PMC 102) to inspect the first image, thereby providing an inspection result of the inspection area. Continuing with the above example, only the reference images of the selected reference units 704 and 706 will be processed, together with the inspection image of the inspection area 700, as illustrated in 720, for purpose of defect detection. This is instead of processing all the four reference units 702, 704, 706 and 708 as in the past, thereby significantly reducing the image processing overhead and improving the throughput of the inspection process.

Specifically, the selected reference images can be pre-processed together with the first image. The pre-processing can include at least one of the following: image alignment and/or rescaling between the first image and the reference images, noise cancellation on the first image and the reference images, and segmentation on the first image and the reference images etc. By way of example, the image alignment can include image registration between the first image and the reference images for purpose of correcting shifts caused by various factors, such as, e.g., drifts during the inspection process, etc. By way of another example, noise cancellation can be performed by filtering the nuisances and/or noises on the first image and the reference images caused by different variations such as, e.g., process variation and/or color variation, etc. By way of further example, the segmentation can be performed on the first image and the reference images in accordance with different noise levels of different areas on the die/wafer, and different detection thresholds can be used for different segments. Once the images are pre-processed, each pixel in the first image can be compared with respective reference pixels thereof. It is assured that the reference pixels, as needed (for U2U inspection), are all included in the selected reference units and the inspection area, after the determination process as described above.

In some embodiments, at least one difference image can be generated based on the difference between pixel values of the first image and pixel values of the respective reference pixels. Optionally, at least one grade image can also be generated based on the at least one difference image and a predefined difference normalization factor. The predefined difference normalization factor can be determined based on behavior of a normal population of pixel values and can be used to normalize the pixel values of the difference image. By way of example, the grade of a pixel can be calculated as a ratio between a corresponding pixel value of the difference image and the predefined difference normalization factor.

In some embodiments, the inspection result can be in the form of a defect map indicative of defect distribution in the inspection area (i.e., suspected locations in the inspection area having high probability of being a defect of interest (DOI)). The defect map can be generated by determining locations of suspected defects based on the at least one difference image or the at least one grade image using a detection threshold. In some embodiments, the generated defect map can be informative of a set of defect candidates each associated with one or more defect characteristics including, such as, e.g., locations, strength and size of the respective defect candidate, etc.

In some cases, the inspection result can be provided to a review tool. The review tool can capture review images at locations of the defect candidates as indicated in the defect map, and review the review images for ascertaining whether a defect candidate is a DOI or nuisance.

In some embodiments, the specimen to be inspected in the presently disclosed subject matter can be selected from a group comprising logic device (also known as microprocessor), Dynamic random-access memory (DRAM), Vertical NAND (V-NAND) Flash memory, and 3D Crosspoint memory (XPS) etc.

It is noted that the above illustrated examples, such as, e.g., the inspection area and reference unit examples, as well as the specific structures thereof are for illustrative purposes only, and the teachings of the presently disclosed subject matter are not bound by these specific examples as described above. Other suitable examples and structures can be applicable in addition to, or in lieu of, the above.

In embodiments of the presently disclosed subject matter one or more stages illustrated in the figures may be executed in a different order, and/or one or more groups of stages may be executed simultaneously, and vice versa. By way of example, blocks 202 and 204 in FIG. 2 can be executed in a different order, or in some cases can be executed simultaneously. By way of another example, blocks 300 and 310 in FIG. 3 can be executed in a different order, or, in some cases, can be executed simultaneously.

It is to be noted that the proposed inspection process as described above can be used in runtime inspection for reducing the image processing overhead and improving the throughput of the inspection process. In some cases, the proposed inspection process can constitute part of the inspection recipe usable for runtime inspection. Therefore, certain embodiments of the present disclosure include a system and method of generating an inspection recipe including the above described inspection process.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of inspecting a semiconductor specimen, the system comprising:
    an inspection machine configured to acquire a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit; and
    a processing and memory circuitry (PMC) configured to:
        obtain a second image informative of one or more partitions of the inspection area respectively associated with one or more inspection algorithms, wherein the second image is aligned with the first image, and the one or more inspection algorithms are usable to inspect pixels of the first image aligned within the one or more partitions;
        for each given pixel of the first image, determine location of one or more reference pixels thereof based on an inspection algorithm associated with a respective partition of the second image that the given pixel is aligned within;

select, from the group of candidate reference units, one or more specific reference units actually required for inspecting the inspection area, based on the determined location of reference pixels for at least some pixels of the first image; and use one or more reference images corresponding to the selected reference units to inspect the first image, thereby providing an inspection result of the inspection area.

2. The computerized system according to claim 1, wherein the inspection machine is an inspection tool, and the first image is an inspection image captured by the inspection tool.

3. The computerized system according to claim 1, wherein the second image is generated based on design data of the die.

4. The computerized system according to claim 1, wherein the one or more regions comprise at least one non-repetitive region which does not comprise repetitive structural elements.

5. The computerized system according to claim 4, wherein the one or more regions further comprise a repetitive region at least partially surrounded by the at least one non-repetitive region, the repetitive region comprising one or more arrays of repetitive structural elements.

6. The computerized system according to claim 1, wherein the one or more inspection algorithms are selected from a group comprising: Cell to Cell, Die to Die, Unit to Unit, and no inspection required.

7. The computerized system according to claim 1, wherein, for each given pixel of the first image, the location of the one or more reference pixels is within one or more of the following: one or more preceding reference units, one or more subsequent reference units, one or more reference units within the inspection area, and one or more reference dies.

8. The computerized system according to claim 1, wherein the group of candidate reference units comprises one or more precedent reference units and one or more subsequent reference units, and the selecting specific reference units comprises:

determining a number of specific precedent reference units from the one or more precedent reference units based on reference pixel distribution of one or more pixels in a first inspection unit of the inspection area; and determining a number of specific subsequent reference units from the one or more subsequent reference units based on reference pixel distribution of one or more pixels in a last inspection unit of the inspection area;

wherein the specific precedent reference units and the specific subsequent reference units constitute the selected specific reference units.

9. The computerized system according to claim 8, wherein the determining the number of specific precedent reference units comprises: if a reference pixel of at least one pixel of the first inspection unit is located in a first precedent reference unit of the one or more precedent reference units, determining the number of specific precedent reference units to be two, otherwise if a reference pixel of at least one pixel of the first inspection unit is located in a second precedent reference unit of the one or more precedent reference units, determining the number of specific precedent reference units to be one, otherwise determining the number of specific precedent reference units to be zero.

10. The computerized system according to claim 8, wherein the determining the number of specific subsequent reference units comprises: if a reference pixel of at least one pixel of the last inspection unit is located in a second subsequent reference unit, determining the number of specific subsequent reference units to be two, otherwise if a reference pixel of at least one pixel of the last inspection unit is located in a first subsequent reference unit, determining the number of specific subsequent reference units to be one, otherwise determining the number of specific subsequent reference units to be zero.

11. The computerized system according to claim 1, wherein the using one or more reference images corresponding to the selected reference units to inspect the first image comprises pre-processing the one or more reference images together with the first image, and comparing each pixel in the first image with respective reference pixels thereof.

12. The computerized system according to claim 1, wherein the specimen is selected from a group comprising logic device, Dynamic random-access memory (DRAM), Vertical NAND (V-NAND) Flash memory, and 3D Crosspoint memory (XPS).

13. The computerized system according to claim 1, wherein the inspection result is a defect map indicative of defect distribution in the inspection area.

14. A computerized method of inspecting a semiconductor specimen, the method comprising:

acquiring, by an inspection machine, a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit;

obtaining, by a processing and memory circuitry (PMC), a second image informative of one or more partitions of the inspection area respectively associated with one or more inspection algorithms, wherein the second image is aligned with the first image, and the one or more inspection algorithms are usable to inspect pixels of the first image aligned within the one or more partitions;

for each given pixel of the first image, by the PMC, determining location of one or more reference pixels thereof based on an inspection algorithm associated with a respective partition of the second image that the given pixel is aligned within;

selecting, by the PMC, from the group of candidate reference units, one or more specific reference units actually required for inspecting the inspection area, based on the determined location of reference pixels for at least some pixels of the first image; and using by the PMC, one or more reference images corresponding to the selected reference units to inspect the first image, thereby providing an inspection result of the inspection area.

15. The computerized method according to claim 14, wherein the one or more regions comprise at least one non-repetitive region which does not comprise repetitive structural elements.

16. The computerized method according to claim 15, wherein the one or more regions further comprise a repetitive region at least partially surrounded by the at least one non-repetitive region, the repetitive region comprising one or more arrays of repetitive structural elements.

17. The computerized method according to claim 14, wherein the group of candidate reference units comprises one or more precedent reference units and one or more subsequent reference units, and the PMC is configured to select specific reference units by:
   determining a number of specific precedent reference units from the one or more precedent reference units based on reference pixel distribution of one or more pixels in a first inspection unit of the inspection area; and
   determining the number of specific subsequent reference units from the one or more subsequent reference units based on reference pixel distribution of one or more pixels in a last inspection unit of the inspection area;
   wherein the specific precedent reference units and the specific subsequent reference units constitute the selected specific reference units.

18. The computerized method according to claim 17, wherein the determining the number of specific precedent reference units comprises: if a reference pixel of at least one pixel of the first inspection unit is located in a first precedent reference unit of the one or more precedent reference units, determining the number of specific precedent reference units to be two, otherwise, if a reference pixel of at least one pixel of the first inspection unit is located in a second precedent reference unit of the one or more precedent reference units, determining the number of specific precedent reference units to be one, otherwise determining the number of specific precedent reference units to be zero.

19. The computerized method according to claim 17, wherein the determining the number of specific subsequent reference units comprises: if a reference pixel of at least one pixel of the last inspection unit is located in a second subsequent reference unit, determining the number of specific subsequent reference units to be two, otherwise if a reference pixel of at least one pixel of the last inspection unit is located in a first subsequent reference unit, determining the number of specific subsequent reference units to be one, otherwise determining the number of specific subsequent reference units to be zero.

20. A non-transitory computer readable storage medium tangibly embodying a program of instructions that, when executed by a computer, cause the computer to perform a method of inspecting a semiconductor specimen, the method comprising:
   obtaining, acquiring by an inspection machine, a first image of an inspection area of a die of the semiconductor specimen and a group of reference images corresponding to a group of candidate reference units proximate to the inspection area and selectable to be used for inspecting the inspection area, the inspection area comprising at least one inspection unit or part thereof, each inspection unit comprising one or more regions repetitive with respect to corresponding regions of one or more reference units proximate to the inspection unit, the one or more reference units having the same size and design pattern as of the inspection unit and usable for inspection of the inspection unit;
   obtaining, by a processing and memory circuitry (PMC), a second image informative of one or more partitions of the inspection area respectively associated with one or more inspection algorithms, wherein the second image is aligned with the first image, and the one or more inspection algorithms are usable to inspect pixels of the first image aligned within the one or more partitions;
   for each given pixel of the first image, determining, by the PMC, location of one or more reference pixels thereof based on an inspection algorithm associated with a respective partition of the second image that the given pixel is aligned within;
   selecting, by the PMC, from the group of candidate reference units, one or more specific reference units actually required for inspecting the inspection area, based on the determined location of reference pixels for at least some pixels of the first image; and
   using, by the PMC, one or more reference images corresponding to the selected reference units to inspect the first image, thereby providing an inspection result of the inspection area.

* * * * *